United States Patent
Kwon et al.

(10) Patent No.: US 6,869,108 B2
(45) Date of Patent: Mar. 22, 2005

(54) TUBE COUPLER

(75) Inventors: Oh-Kyung Kwon, Gyeongaangnam-Do (KR); Young-Ju Kim, Gyeongaangnam-Do (KR)

(73) Assignee: Jinbo Precision Ind. Co., Ltd., Gyeongsangnam-Do (KR)

(*) Notice: Subject to any disclaimer, the term of this patent is extended or adjusted under 35 U.S.C. 154(b) by 0 days.

(21) Appl. No.: 10/468,122

(22) PCT Filed: Feb. 19, 2002

(86) PCT No.: PCT/KR02/00252

§ 371 (c)(1),
(2), (4) Date: Aug. 15, 2003

(87) PCT Pub. No.: WO02/066880

PCT Pub. Date: Aug. 29, 2002

(65) Prior Publication Data

US 2004/0056484 A1 Mar. 25, 2004

(30) Foreign Application Priority Data

Feb. 19, 2001 (KR) .......................... 2001-4165

(51) Int. Cl.[7] .............................. F16L 27/00
(52) U.S. Cl. .................. 285/276; 285/281; 285/321
(58) Field of Search ........................ 285/276, 278, 285/280, 281, 321, 921, 182

(56) References Cited

U.S. PATENT DOCUMENTS

| | | | | | |
|---|---|---|---|---|---|
| 3,129,777 | A | * | 4/1964 | Haspert | 285/321 |
| 3,363,919 | A | * | 1/1968 | Brazell, II | 285/276 |
| 3,900,221 | A | * | 8/1975 | Fouts | 285/276 |
| 4,240,654 | A | * | 12/1980 | Gladieux | 285/276 |
| 4,804,206 | A | * | 2/1989 | Wood et al. | 285/276 |
| 5,443,580 | A | * | 8/1995 | Cotter | 285/276 |
| 5,845,944 | A | * | 12/1998 | Enger et al. | 285/276 |
| 6,003,907 | A | * | 12/1999 | Gau et al. | 285/276 |
| 6,027,144 | A | * | 2/2000 | Hagen et al. | 285/321 |
| 6,095,570 | A | * | 8/2000 | Hagen et al. | 285/321 |
| 6,186,557 | B1 | * | 2/2001 | Funk | 285/321 |

* cited by examiner

*Primary Examiner*—David Bochna
(74) *Attorney, Agent, or Firm*—Lee, Hong, Degerman, Kang & Schmadeka

(57) ABSTRACT

A tube for a socket body having a structure of grooves and ribs using a reduced number of seal rings which can be easily manufactured. The tube coupler connects an easily-processed cocking ring to the socket.

3 Claims, 4 Drawing Sheets

TUBE COUPLER

FIELD OF THE INVENTION

The present invention relates to a tube coupler used to connect a various kinds of tubes such as swivel T or elbow type tubes, and in particular to an improved tube coupler which can easily perform a manufacturing process by omitting a direct process for a socket by connecting a easily-processed cocking ring to the socket, simplify a processing shape by decreasing a number of seal rings for air tightness, and cut down the prime cost.

BACKGROUND ART

In general, one end of a tube coupler is inserted into a body of an apparatus, and a tube such as a hose is inserted into the other end of the tube coupler to form a channel.

In the conventional tube coupler, as shown in FIGS. 1 and 2, when a stud member 20 is inserted into a socket member 10, a locking ring 30 installed at the outer circumference of the stud member 20 is shrunken along an inclined surface 12 formed at the end of the socket member 10. When the locking ring 30 of the stud member 20 is closely adhered to the inclined surface 12 of the socket member 10, the locking ring 30 is hooked by a right-angled hooking groove 14 formed at the inner circumference of the socket member 10, thereby connecting the stud member 20 to the socket member 10.

In addition, two seal rings 32 and 33 are positioned at the front and rear sides of the locking ring 30 in an axial direction. When the stud member 20 is inserted into the socket member 10, the seal ring 33 positioned at the front side passes the hooking groove 14 without any resistance, receives pressure in an orthogonal direction to the axis around a ring-shaped rib 16 formed at the inner circumference of the socket member 10, and maintains a pressured state between the stud member 20 and the socket member 10 in order to prevent leakage. The seal ring 32 positioned at the rear side is closely adhered to the inclined surface 12 of the socket member 10 before the locking ring 30 is hooked by the hooking groove 14. When the locking ring 30 is hooked by the hooking groove 14, the seal ring 32 receives virtual pressure in an inclined direction between the socket member 10 and the stud member 20 in order to prevent leakage.

A small-sized safety ring 35 installed at the end of the stud member 20 is hooked by a groove 17 formed at the inner circumference of the socket member 10 so that the stud member 20 can maintain an interim connection state not to be completely connected to the socket member 10. In the case that the stud member 20 is completely inserted into the socket member 10, the safety ring 35 is closely adhered to the inner circumference of the socket member 10 for performing a seal ring function for preventing a low pressure fluid from being externally leaked.

However, the conventional tube coupler has difficulty in a process because the seal rings 32 and 33, the locking ring 30 and the safety ring 35 are positioned in the socket member 10, and the inclined surface 12, the hooking groove 14, the groove 17 and the rib 16 have complicated shapes. Especially, when the socket member 10 is formed in an elbow type, if the tube coupler is fixed and processed to a chuck of a lathe by using an exclusive use jig, the center of gravity is moved to one side. It is thus difficult to perform a precision process due to serious vibration. In order to solve the foregoing problems, a balance weight is mounted on the jig, which complicates fabrication of the jig.

Moreover, the conventional tube coupler uses at least two seal rings 32 and 33. So as to install the seal rings 32 and 33, a plurality of hooking grooves 14, grooves 17 and ribs 16 must be formed in the socket member 10, and a large number of grooves and ribs must be formed in the stud member 20, which complicates a manufacturing process.

DISCLOSURE OF THE INVENTION

Accordingly, it is an object of the present invention to provide a tube coupler which can easily perform a process of a socket body and simplify a structure of grooves and ribs by using a reduced number of seal rings for easy manufacturing.

In order to achieve the above-described object of the invention, there is provided a tube coupler including: a socket body having a jaw at its inner circumference to contact a seal ring; a cocking ring being incorporated with the socket body by a coupling means, and having grooves where a safety ring for preventing separation and a locking ring are hooked in an axial direction; a nipple having grooves where the safety ring for preventing separation and the locking ring are positioned at its outer circumference in the axial direction; a seal ring inserted into the groove formed by the jaw of the socket body and the inside end of the cocking ring, and pressure-adhered between the outer circumference of the nipple and the inner circumference of the socket body; the locking ring hooked by the edge of a rib formed at the outer circumference of the nipple and the edge of the groove formed at the inner circumference of the cocking ring, for maintaining a hooking state of the nipple; and the safety ring for preventing separation hooked by the edge of another rib formed at the outer circumference of the nipple and the edge of another groove formed at the inner circumference of the cocking ring, for maintaining an interim connection state of the nipple.

In accordance with the present invention, the grooves and the ribs for the seal ring are processed in the cocking ring, and the cocking ring is connected to the socket body. Therefore, a high precision process needs not to be directly performed on the socket body, thereby simplifying a manufacturing process. In addition, one seal ring is used, and thus a number of operations for processing the grooves and ribs is reduced to cut down the prime cost. Since the tube coupler is formed in a swivel type, a precise position is not determined when a hose is connected to an apparatus to transfer fluid, but determined by rotating the socket body after tight coupling of the nipple. As a result, the tube coupler is advantageous in mounting.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A tube coupler in accordance with a preferred embodiment of the present invention will now be described in detail with reference to the accompanying drawings.

Figure 1:
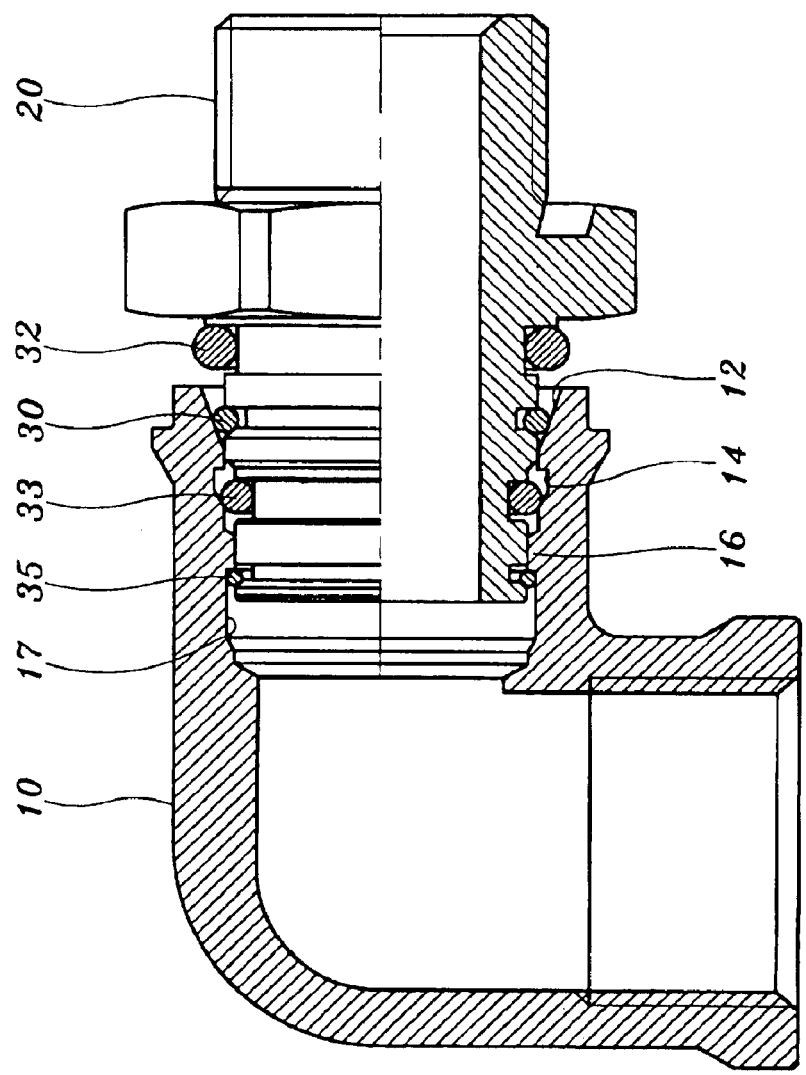
FIG. 1 is a cross-sectional diagram illustrating a conventional tube coupler just before insertion.
Figure 2:
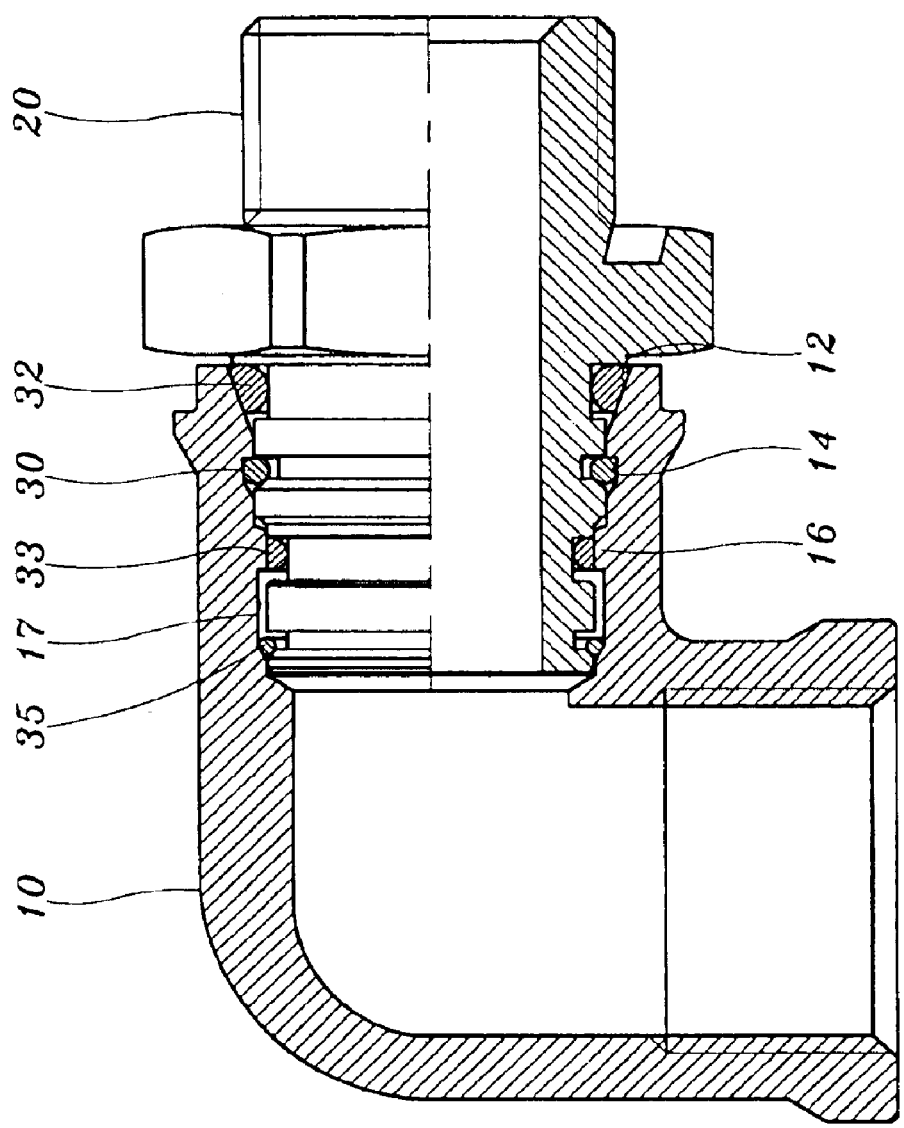
FIG. 2 is a cross-sectional diagram illustrating an insertion state of the conventional tube coupler.
Figure 3:
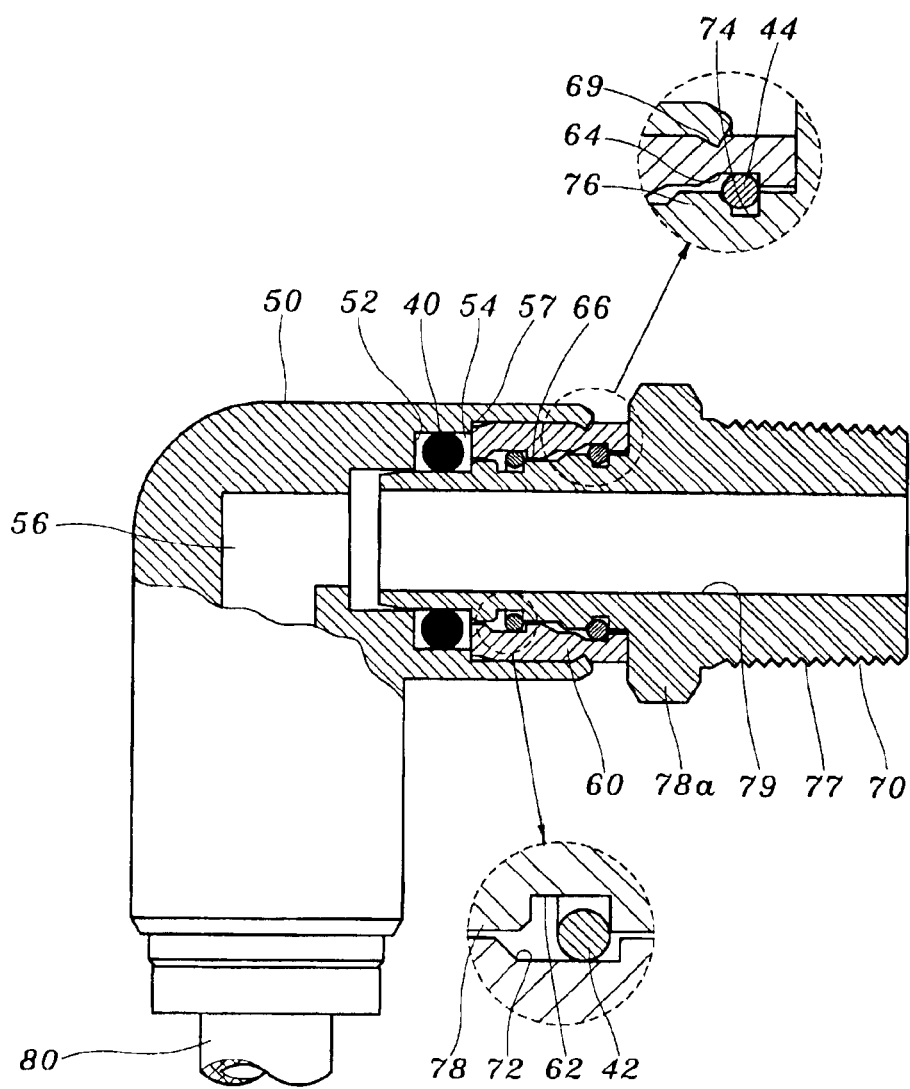
FIG. 3 is a cross-sectional diagram illustrating a tube coupler in accordance with the present invention.
Figure 4:
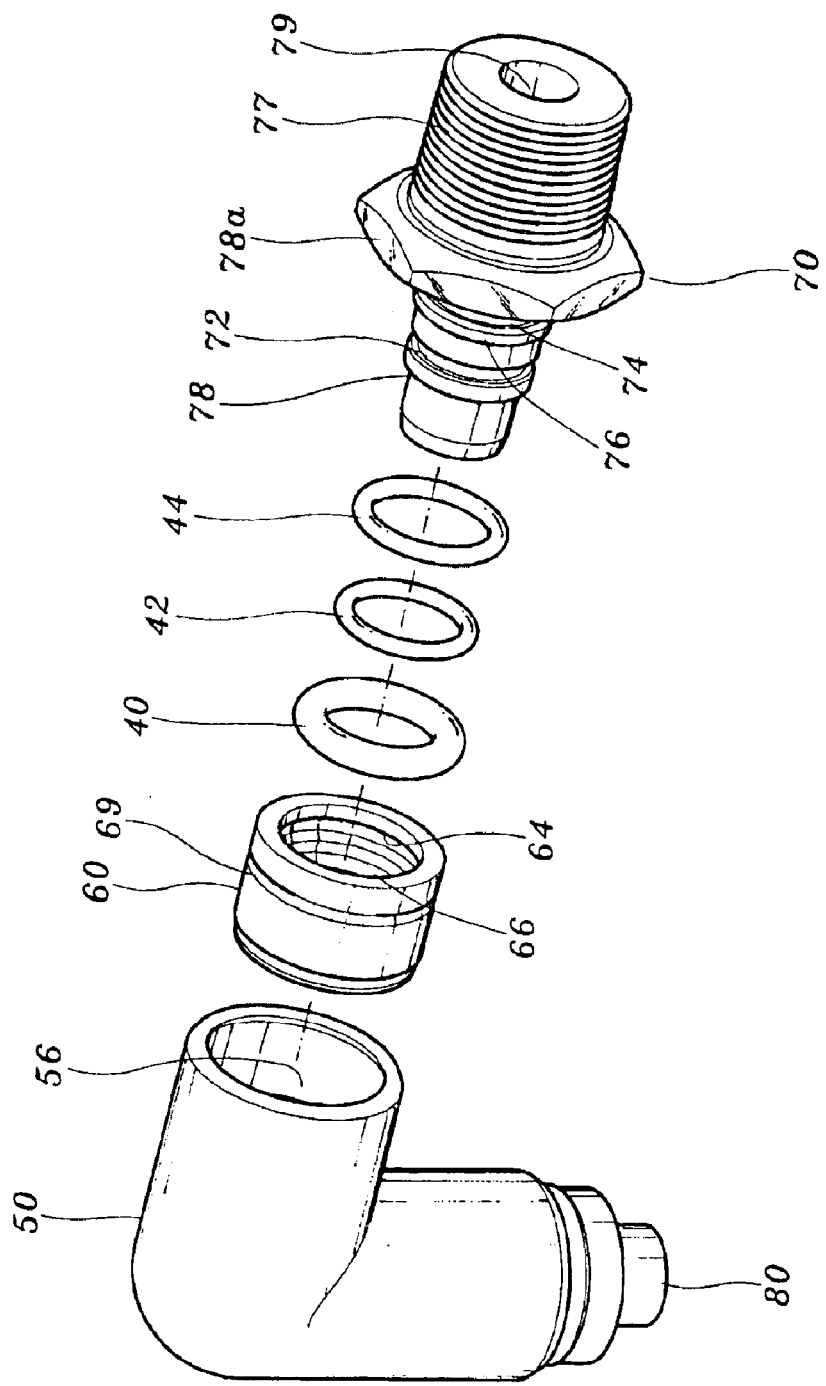
FIG. 4 is a disassembled perspective diagram illustrating the tube coupler in accordance with the present invention.

FIGS. 3 and 4 are a cross-sectional diagram and a disassembled perspective diagram respectively illustrating the tube coupler in accordance with the present invention. Referring to FIGS. 3 and 4, the tube coupler includes: an elbow-type socket body 50; a cocking ring 60 connected to the socket body 50; a nipple 70 inserted into the cocking ring 60; a seal ring 40 installed at a leaked area for performing an airtight function; a locking ring 44; and a safety ring for preventing separation.

Here, the socket body 50 can be formed in an elbow type having an L-shaped fluid channel 56 at its center portion. A jaw 52 contacting the seal ring 40 and a jaw 57 for restricting insertion to fix the edge of the socket body 50 to the cocking groove 60 when the cocking groove 60 is inserted in an axial direction are formed at the inner circumference of the socket body 50.

In addition, a ring-shaped cocking groove 69 is formed, for example in a V shape along the outer circumference of the cocking ring 60. A large diameter unit and a small diameter unit are formed in a stair shape with different diameters. An inclined rib 66 is formed therebetween. The large diameter unit and the small diameter unit respectively have grooves 64 and 62 for insertion of the locking ring 44 and the safety ring 42 for preventing separation.

The rib 66 formed at the inner circumference of the cocking ring 60 is formed in an inclined surface shape to generate slow transformation in an insertion direction of the safety ring 42 for preventing separation.

On the other hand, the outer circumference of the nipple 70 is formed in a stair shape having its outer diameter decreased toward the edge. The seal ring 40, the safety ring 42 for preventing separation and the locking ring 44 are positioned at the outer circumference of the nipple 70 from the small to large diameter.

In addition, grooves 72 and 74 which the safety ring 42 for preventing separation and the locking ring 44 are inserted into are formed at the nipple 70. A ring-shaped rib 76 is formed between the grooves 72 and 74. A general thread 77 is formed at the opposite side of the nipple 70. A hexagonal nut unit 78a is formed at the center portion to twist the nipple 70 with a tool such as a spanner in screw connection. A fluid channel 79 where the fluid flows is formed at the center portion of the nipple 70.

The operation of the tube coupler in accordance with the present invention will now be described in detail with reference to the accompanying drawings.

As illustrated in FIGS. 3 and 4, in the connection process of the cocking ring 60 and the socket body 50, when the seal ring 40 is inserted into the jaw 52 of the socket body 50 and the cocking ring 60 is inserted thereinto, the cocking ring 50 is hooked by the jaw 57 of the socket body 50. In a state where the cocking ring 60 is fixed not to be separated, when the edge of the socket body 50 is bent to be hooked by the cocking groove 69 formed at the outer circumference of the cocking ring 60, the cocking ring 60 and the socket body 50 are incorporated.

On the other hand, in a state where the nipple 70 is separated from the cocking ring 60, when the nipple 70 is inserted into the cocking ring 60 for interim connection, the safety ring 42 for preventing separation fastened to the nipple 70 passes the large diameter unit of the cocking ring 60, is compressed and transformed through the rib 66 of the cocking ring 60 at the small diameter unit, and is forcibly inserted into the cocking ring 60.

Here, when the safety ring 42 for preventing separation is positioned in the groove 62 formed at the inner circumference of the cocking ring 60, the safety ring 42 returns to the original shape to a certain extent due to elasticity, and thus is hooked by the edge of the groove 62 and the edge of the rib 78 of the nipple 70, thereby preventing the nipple 70 from being separated from the cocking ring 60. The locking ring 44 fails to be inserted into the cocking ring 60 and maintains an interim connection state outside.

Thereafter, when the nipple 70 is fixed not to move in the axial direction, if the nipple 70 is pushed once in the axial direction, the locking ring 44 is inserted into the cocking ring 60 and forcibly compressed and transformed at the same time. When the locking ring 44 reaches the groove 64 formed at the inner circumference of the cocking ring 60, the locking ring 44 returns to the original shape, and thus is hooked by the edge of the groove 64 formed at the cocking ring 60 and the edge of the rib 76 formed at the outer circumference of the nipple 70, thereby preventing the nipple 70 from being separated from the cocking ring 60. Here, the safety ring 42 is separated from the edge of the rib 78 formed at the nipple 70, returns to the original shape, and thus is released from the groove 62 formed at the outer circumference of the cocking ring 60.

For reference, since the nipple 70 and the socket body 50 are closely adhered to each other having the seal ring 40 therebetween, the cocking ring 60 and the socket body 50 do not have any sealing device.

As described above, in a state where the socket body 50, the cocking ring 60 and the nipple 70 are connected, a hose 80 is inserted into the socket body 50, and the nipple 70 is threaded to an apparatus (not shown), when the fluid is transferred therethrough, the seal ring 40 positioned between the socket body 50 and the nipple 70 resists fluid pressure and prevents leakage. Here, the socket body 50 and the nipple 70 are formed in a rotatable swivel type, and thus the socket body 50 is rotated to determine the position in a hose direction after the tight coupling of the nipple.

The elbow-type tube coupler was exemplified in the embodiment of the invention, but it is apparent that the present invention can be applied to a variety of tube couplers including line or T type couplers and also executed by a person having ordinary skill in the art by the foregoing construction and the following claims.

What is claimed is:

1. A tube coupler comprising:

a socket body 50 having a jaw 52 at its inner circumference to contact a seal ring 40;

a cocking ring 60 being incorporated with the socket body 50 by a coupling means, and having grooves 62 and 64 where a safety ring 42 for preventing separation and a locking ring 44 are hooked at its inner circumference in an axial direction;

a nipple 70 having grooves 72 and 74 where the safety ring 42 for preventing separation and the locking ring 44 are positioned at its outer circumference in the axial direction;

a seal ring 40 inserted into the groove 54 formed by the jaw 52 of the socket body 50 and the inside end of the cocking ring 60, and pressure-adhered between the outer circumference of the nipple 70 and the inner circumference of the socket body 50;

the locking ring 44 hooked by the edge of a rib 76 formed at the outer circumference of the nipple 70 and the edge of the groove 64 formed at the inner circumference of the cocking ring 60, for maintaining a hooking state of the nipple 70; and the safety ring 42 for preventing separation hooked by the edge of another rib 78 formed at the outer circumference of the nipple 70 and the edge of another groove 62 formed at the inner circumference of the cocking ring

60, for maintaining an interim connection state of the nipple 70.

2. The tube coupler according to claim 1, wherein the coupling means for coupling the socket body 50 and the cocking ring 60 comprises a ring-shaped cocking groove 69 formed along the outer circumference of the cocking ring 60 and the end portion of the socket body 50 is curved toward the cocking groove 69.

3. The tube coupler according to claim 1, wherein an axial cross section of the contact surface between the cocking ring 60 and the nipple 70 upon the coupling of the cocking ring 60 and the nipple 70 is stepped in such a manner that the axial cross section is steppedly decreased in diameter as the cocking ring 60 goes toward an end portion of the nipple 70.

\* \* \* \* \*